United States Patent [19]

Reimann et al.

[11] Patent Number: 4,476,979

[45] Date of Patent: Oct. 16, 1984

[54] THERMOPLASTIC BAG PACK

[75] Inventors: George J. Reimann, Pittsford; Gordon L. Benoit, Macedon; James R. Gavin, Pittsford; Michael A. Schneider, Hilton, all of N.Y.

[73] Assignee: Mobil Oil Corporation, New York, N.Y.

[21] Appl. No.: 548,470

[22] Filed: Nov. 3, 1983

[51] Int. Cl.³ .......................... B65D 1/34; B65D 6/04
[52] U.S. Cl. ..................................... 206/554; 383/8; 383/9; 383/903
[58] Field of Search ................ 206/554; 383/8, 9, 903

[56] References Cited

U.S. PATENT DOCUMENTS

| | | | |
|---|---|---|---|
| 328,888 | 10/1885 | Hunt | 206/554 |
| 3,317,037 | 5/1967 | Russell | 206/554 |
| 3,352,411 | 11/1967 | Schwarzkope | 206/554 |
| 3,797,732 | 3/1974 | Melin et al. | 206/554 |
| 3,804,322 | 4/1974 | Ericson | 206/554 |
| 4,165,832 | 8/1979 | Kuklies et al. | 206/554 |

Primary Examiner—Joseph Man-Fu Moy
Attorney, Agent, or Firm—Alexander J. McKillop; Michael G. Gilman; James P. O'Sullivan, Sr.

[57] ABSTRACT

A bag pack and individual bags characterized by having handles which are integral extensions of the front and rear of said bag. The bags have a bag mouth which includes stress relief curves on both sides of an upwardly extending tab. The tab includes at least one orifice which is positioned to create comparatively narrow webs which serve to be the tear-off points severing individual bags from the pack. The bags are bonded together via said tab at areas adjacent said orifice.

10 Claims, 3 Drawing Figures

THERMOPLASTIC BAG PACK

BACKGROUND OF THE INVENTION

This invention relates to a handled thermoplastic bag pack.

In the recent past, thermoplastic handled grocery sacks have begun to compete with kraft paper grocery sacks, which still dominate the market by a large margin. Thermoplastic grocery sacks have many advantages over the conventional kraft paper grocery sack. Included among these advantages are: superior tear strength; being completely waterproof; having the convenience of handles; faster loading than paper bags; have more and better secondary use capabilities; have greater density and, therefore, will occupy less space than paper bags; etc.

A conventional manner of providing such handled thermoplastic sacks is to arrange them in a lay flat stack of 50, 100 or more and bond them together by way of tabs which extend upwardly from the bag mouth. This tab, in addition to providing the site at which the plurality of bags are bonded together, also constitutes the tear-off site of each bag from the bonded tabs. These bonded tabs also provide the site from which the pack of bags can be suspended from some suitable support means. For example, a peg or similar suspension means may extend through an orifice in said tabs. U.S. Pat. No. 4,165,832, issued Aug. 28, 1979, the subject of matter of which is, in its entirety, incorporated herein by reference, is an example of the type of thermoplastic grocery sack which forms the subject of the instant invention.

The type of thermoplastic bag pack described in the above-identified patent and in particular as shown in FIG. 4 thereof can be improved upon in the structure of the several means by which the bag pack is supported and in the accommodation for the dispensing of individual bags therefrom.

SUMMARY OF THE INVENTION

The bag pack of the present invention comprises a plurality of stacked thermoplastic bag structures. Each bag comprising a front and rear bag wall and an open mouth portion. The open mouth portion is characterized by having handles which are integral extensions of said walls, said handles being located at opposite ends of said mouth portion. In the region of the bag between the handles, and specifically in that portion of the bag referred to as the bag mouth opening, are upwardly extending tabs. These tabs serve as the point of suspension for a pack of such bags. The tabs also serve as the point of bonding a plurality of the bags together. They further serve as the points of detachment of individual bags from the bag pack. This region of the bag can also be defined in the following manner: the superimposed lines defined by said bag mouth opening in its lay-flat position, are a series of compound curves including (a) stress relief curves at opposite ends of said bag mouth, (see 24 of FIG. 1) said stress relief curves opening or facing in the direction of the handle end of the bag and (b) a curve intermediate said stress relief curves in said bag mouth opening, said curve being at least generally of the same but opposite amplitude as said stress relief curves (see 26 of FIG. 1). Located within the area beneath said (b) curve, but above the point of maximum amplitude of said (a) curves, is at least one orifice which serves to simultaneously be the point accommodating physical suspension of said bag pack and forms at least one preweakened region accommodating tear-off of individual bags. Adjacent this orifice but above the tear-off region is a bonded area connecting the plurality of bags into a bag pack. By separating the orifice from the point of bonding, individual bags are more easily removed.

In one of its forms it is preferred that in the bag pack the above described tab area have at least one orifice within the defined area so as to leave a comparatively easily severable web of film between a portion of the perimeter of the orifice and the closest point on the described line of the bag mouth opening. It is preferred that when a single orifice is employed that it be elongated across the defined area so as to leave a comparatively easily severable web of film between the extremes of the orifice and the bag mouth opening. In another preferred form of the bag pack, a plurality of orifices is within the defined area so as to leave comparatively easily severable webs of film between the orifices and also between a portion of the perimeter of the orifices and the edge of the bag mouth opening. The point of bonding then can be at a wider region of this tab in a non-interfering location with respect to tear-off.

While the bag packs of the present invention may be made of side-seal films with virtually no dimension to the sides of the bag, it is preferred that the sides of the bag be gusseted in order to give a width dimension to the sides of the bag and also to provide a double layer of film in the region of the handles.

DETAILED DESCRIPTION OF THE INVENTION

Figure 1:
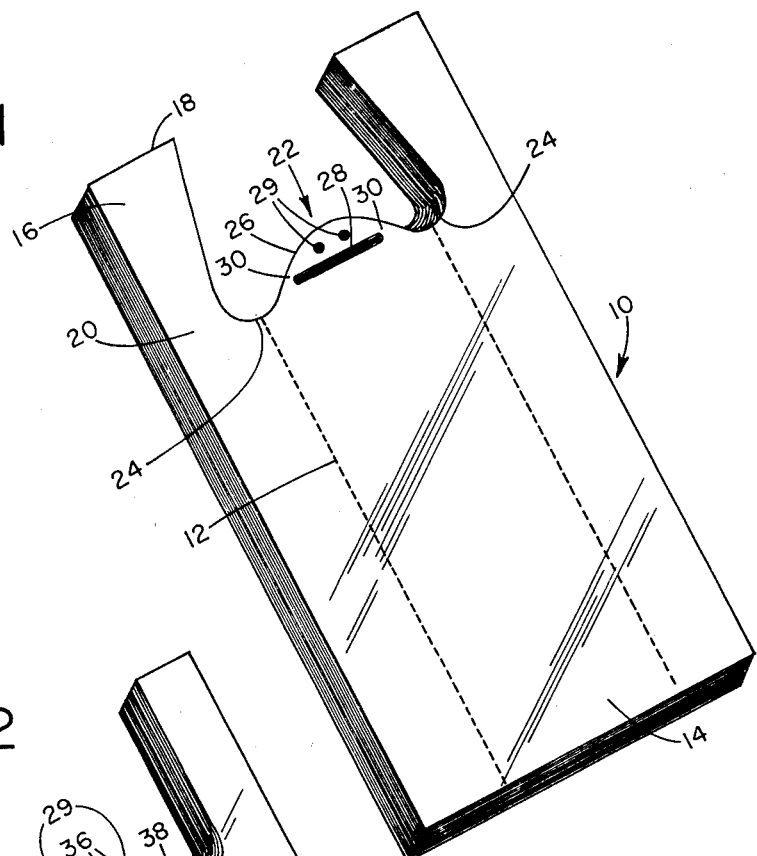
FIG. 1 is a perspective view of a stack of one form of the bag structures of the present invention.

One form of the bag pack and bag structure of the present invention, is shown in FIG. 1 of the accompanying drawing and it generally comprises a pack of handled bags 10. The individual bags are formed from a flattened, side-gusseted thermoplastic tube. The thermoplastic tube can be conveniently made of polyethylene or blends of the same with copolymers of ethylene and any other alpha-olefin. As indicated, the bags are side-gusseted as shown at 12 so as to provide a width dimension to the bags. The bags have a front panel 14 and an identical back panel which is not shown in the drawing. The individual bags have handles 16 which are integral extensions of the front and rear panels of the bag. Because the structure of the bag includes side-gussets 12 the handles therefor are composed of double thicknesses of the film of the bag. The individual bags of the bag pack are shown to have handles which are wider at the top 18 than at the base 20 thereof. This feature provides the user with more plastic film in the handgrip region in order to militate against an uncomfortable "roping" tendency in the carrying of a heavily loaded bag. The bag mouth opening is generally defined by the superimposed compound curve region 22. This compound curve region is defined by the bag mouth region in its lay-flat position. The series of compound curves include stress relief curves 24 at opposite ends of the bag mouth opening and an intermediate curve 26 which is generally of the same but opposite amplitude as the stress relief curves. Located within the area beneath curve 26 but above the point of maximum amplitude of said stress relief curves 24 is at least one orifice 28. As indicate above, this orifice serves two functions. The orifice formed becomes the suspension point for the pack to facilitate dispensing of the individual bags. By accurately dimensioning the webs of film between the orifice and the bag opening, for example, at 30, which can be at opposite ends of the orifice, these webs become the points of tear-off or separation of an individual bag from the bag pack. Located adjacent and above orifice 28 is bonded regions 29 which connects the individual bag tabs one to the other. These bonds are positioned so as to effectively hold the bags together yet not interfere with tear-off of individual bags.

Figure 2:
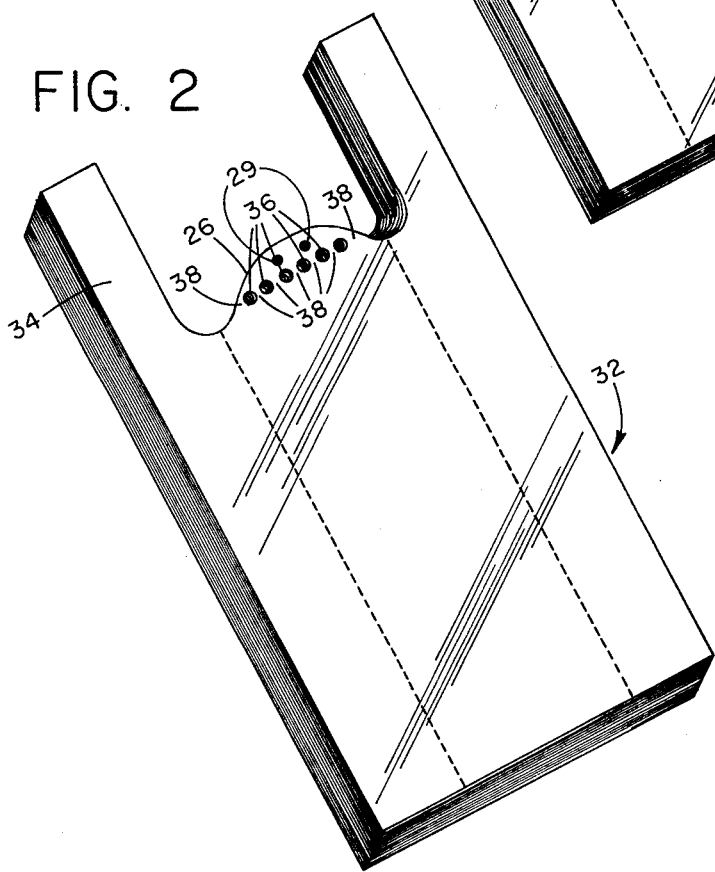
FIG. 2 is a perspective view of a stack of a second form of the bag structures of the present invention.

Another form of the bag pack and bag structure of the present invention is shown in FIG. 2. This bag pack 32 is essentially the same as that depicted in FIG. 1. It differs in that the handles 34 are not wider at the top than at the base thereof and tab 26 contains a plurality of orifices 36 which function somewhat the same as orifice 28 of FIG. 1. They serve as the point of suspension from suitable pegs or a wicket and by virtue of accurately dimensioned webs 38 provide the tear-off point for individual bags to be separated from the bag pack. Above the orifices is a single point of bonding 29 which extends throughout the entire stack of bags. As in FIG. 1, it is in a non-interfering location with respect to individual bag tear-off.

The bag structures of the present invention may be formed into convenient unitary bag packs by the following process: a thermoplastic tube, for example, of a polyethylene film, is simultaneously flattened and gusseted so that the gussets extend inwardly from the sides to an extent such as is shown for example in FIG. 1 at 12. These collapsed and gusseted tubes are, thereafter, sealed and severed at both ends along lines which ultimately constitute the seals at the ends of the handle and at the bottom of the bag. These sealed tubes result in the formation of a structure which can be considered as inwardly gusseted, double end-sealed "pillow cases". Thereafter, a plurality of these end sealed "pillow cases" are stacked one upon the other and a suitably designed cutting die cuts through the stack and simultaneously forms the bag handles and the mouth opening with its included stress relief and tab areas. The orifices 28 of FIG. 1 or 36 of FIG. 2 or the like can be formed simultaneously with this cutting or during a subsequent step.

By forming a bag structure or bag pack structure of this type an absolute minimum of material is lost because the only non-recycleable portion of the structure is that small region or residue of the bag pack remaining after the last bag has been severed from the tab 26.

Figure 3:
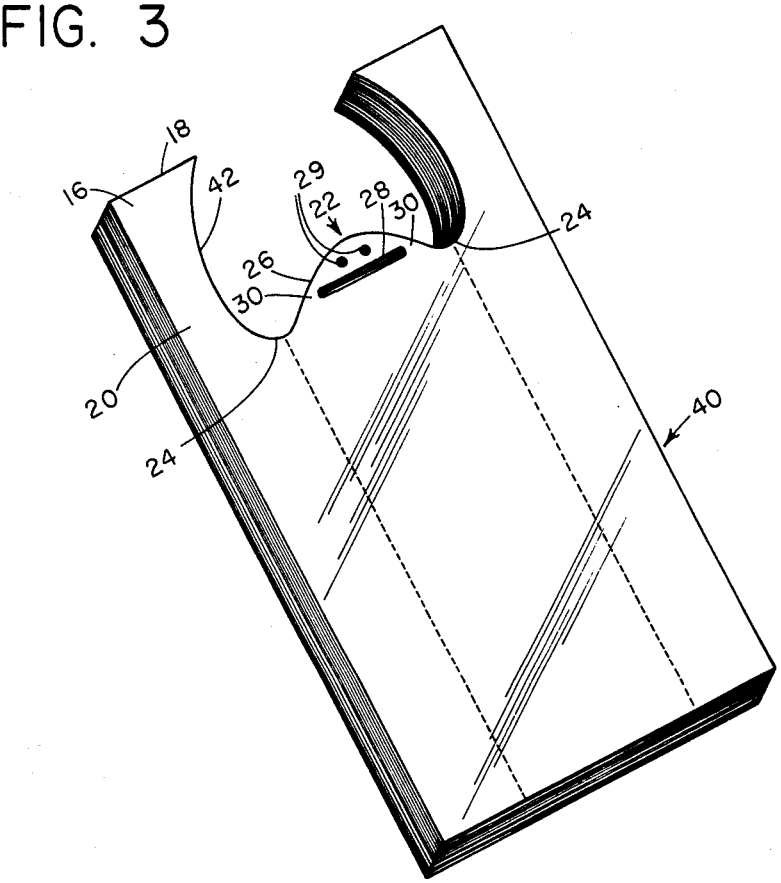
FIG. 3 is a perspective view of a stack of a third form of the bag structures of the present invention.

Still another structure of the bag and bag pack is shown in FIG. 3. This structure is essentially the same as that of FIG. 1 except that configuration of the bag handles 16 is different in the curvature of that portion of the films represented by line 42. This line, representing the inside of the handle from the seal points 18 to the stress relief regions 24, is moderately, but with important effect, curved. This curvature not only saves a small cord-like area of film that is not included in the bag, but also the curve acts in the same manner as stress relief regions 24. Because of the curvature of line 42, stress forces which normally would be along the straight edge depicted in FIG. 1, are moved to a significant extent away from this edge. This minimizes any tendency of the handles to tear along this edge.

In all of the structures illustrated, the individual bags are shown to be bonded together at point or points 29. While this bonding can be effected by any suitable means, it is preferred to effect it by ultrasonic means. More specifically, by the use of any means which can cause inter-welding of the polymer films, small areas are melt-bonded one to the other throughout the entire thickness of the stack to form a bag pack. One effective means is the Ultrasonic Plastic Welding System, Model No. A-1210C-1080, Sonics and Materials Inc., Danbury, CN. This device, has a head modified to cause two small bonds circular in area throughout the full thickness of the bag pack. This results in the formation of two rough cylinders of fused plastic holding the bags together at a point which will not interfere with bag removal. To create the bond the tabs 26 of a stack of bags is placed in the system with the ultrasonic target area being between the orifice region and the top of the tab. The system is energized and the film of each tab in the target area is ultrasonically heated to fusion temperature. On cooling the bags are unitized via the resultant solidified cylinders of plastic.

In use the structures illustrated in the drawing may be mounted on one or more extending pegs and when it is desired to remove an individual bag from the pack, the bag is easily torn from the bag pack and supporting pegs and the handles of the bag can be extended about the ears of any suitable bag holding rack to accommodate loading of the bag.

It is to be understood that the bags described can vary in dimension and materials. For example, any thermoplastic material can be employed, for example, polyolefins, e.g. polyethylene, including blends of polyethylene, such as low density polyethylene with ethylene copolymerized with another alpha olefin to form a linear low density material. There is nothing critical about the gauge dimension of the film employed in the bag. The bag should be capable of carrying the normal supermarket bag load which can range anywhere from a few pounds to about 35 pounds.

What is claimed:

1. A bag pack comprising a plurality of stacked thermoplastic film bag structures each bag comprising a front and rear bag wall and an open mouth portion, said open mouth portion being characterized by having handles which are integral extensions of said walls, said handles being located at opposite ends of said mouth portion, the superimposed lines defined by said bag mouth opening in its lay-flat position are a series of compound curves including (a) stress relief curves at opposite ends of said bag mouth, said stress relief curves opening or facing in the direction of the handle end of the bag and (b) a curve intermediate said stress relief curves in said bag mouth opening, said curve being at least generally of the same but opposite amplitude as said stress relief curves; located within the area beneath said (b) curve, but above the point of maximum amplitude of said (a) curves, is at least one orifice which serves to accommodate physical suspension of said bag pack said orifice being of such a shape and location in said area so as to leave at least one comparatively narrow web serving to accommodate tear-off of individual bags, said plurality of bags being bonded together at said area adjacent to said orifice.

2. The bag pack of claim 1 wherein the individual bag structures have gusseted side walls.

3. The bag pack of claim 2 having a single orifice within said area.

4. The bag pack of claim 3 wherein said orifice is elongated and extends across said area so as to leave a comparatively easily severable web of film between at least one extreme of said orifice and a point on the bag mouth opening.

5. The bag pack of claim 4 having a comparatively easily severable web of film between each extreme of said orifice and points on the bag mouth opening.

6. The bag pack of claim 2 having a plurality of orifices within said area so as to leave a comparatively easily severable web of film between a portion of the perimeter of each of said orifice and between a portion of the perimeter of two orifices and the closest point on the line of said bag mouth opening.

7. The bag pack of claim 4 wherein said bags are bonded together by an inter-welding of said film at said adjacent area.

8. The bag pack of claim 7 wherein said bond is an ultrasonically fused bond.

9. The bag pack of claim 1 wherein said handles are wider at the top than at the region of said stress relief curves and the lines corresponding to the inside edges of said handles from the top of the handles to the region of the stress relief curves are also curved to meet said stress relief curves.

10. A bag as separated from the bag pack of claim 9.

* * * * *